US008030426B2

(12) United States Patent
Fuchs et al.

(10) Patent No.: US 8,030,426 B2
(45) Date of Patent: Oct. 4, 2011

(54) PROPYLENE POLYMERS

(75) Inventors: Alexander Fuchs, Ferrara (IT); Daniele Bugada, Newark, DE (US); Janine Emrich, Smyrna, DE (US)

(73) Assignee: Basell Polyolefine GmbH, Wesseling (DE)

( * ) Notice: Subject to any disclaimer, the term of this patent is extended or adjusted under 35 U.S.C. 154(b) by 491 days.

(21) Appl. No.: 12/083,914

(22) PCT Filed: Oct. 12, 2006

(86) PCT No.: PCT/EP2006/067356
§ 371 (c)(1),
(2), (4) Date: Apr. 21, 2008

(87) PCT Pub. No.: WO2007/045603
PCT Pub. Date: Apr. 26, 2007

(65) Prior Publication Data
US 2009/0259009 A1    Oct. 15, 2009

Related U.S. Application Data

(60) Provisional application No. 60/729,479, filed on Oct. 21, 2005.

(51) Int. Cl.
*C08F 110/02* (2006.01)
(52) U.S. Cl. ..................................... 526/351
(58) Field of Classification Search .................. 526/351
See application file for complete search history.

(56) References Cited

U.S. PATENT DOCUMENTS

| | | | |
|---|---|---|---|
| 5,698,487 A | 12/1997 | Sacchetti et al. |
| 5,741,563 A | 4/1998 | Mehta et al. |
| 6,399,533 B2 | 6/2002 | Sacchetti et al. |
| 6,559,252 B1 | 5/2003 | Horton et al. |
| 6,608,224 B2 | 8/2003 | Resconi et al. |
| 6,841,501 B2 | 1/2005 | Resconi et al. |
| 6,878,786 B2 | 4/2005 | Resconi et al. |
| 6,953,829 B2 | 10/2005 | Kratzer et al. |
| 7,101,940 B2 | 9/2006 | Schottek et al. |
| 7,122,606 B2 | 10/2006 | Tonti et al. |
| 7,141,527 B1 | 11/2006 | Van Baar et al. |
| 7,314,903 B2 | 1/2008 | Resconi et al. |
| 7,470,764 B2 * | 12/2008 | Blackmon et al. ............ 526/351 |
| 2003/0149199 A1 | 8/2003 | Schottek et al. |
| 2004/0132612 A1 | 7/2004 | Resconi et al. |
| 2006/0167128 A1 | 7/2006 | Olivier et al. |

FOREIGN PATENT DOCUMENTS

| | | |
|---|---|---|
| DE | 19962814 | 6/2001 |
| DE | 19962910 | 7/2001 |
| EP | 633272 | 1/1995 |
| WO | 91/02012 | 2/1991 |
| WO | 92/00333 | 1/1992 |
| WO | 95/32995 | 12/1995 |
| WO | 99/21899 | 5/1999 |
| WO | 01/21674 | 3/2001 |
| WO | 01/62764 | 8/2001 |
| WO | 02/102811 | 12/2002 |
| WO | 2004/005360 | 1/2004 |
| WO | 2005/005495 | 1/2005 |
| WO | 2007/045590 | 4/2007 |
| WO | 2007/045600 | 4/2007 |

OTHER PUBLICATIONS

L. Resconi et al., "Selectivity in Propene Polymerization with Metallocene Catalysts," *Chem. Review*, vol. 100(4), p. 1253-1345 (2000).
R. Gächter & H. Müller, "Stabilizers, Processing Aids, Plasticizers, Fillers, Reinforcements, Colorants for Thermoplastics," *Plastics Additives Handbook*—4th Edition, Carl Hanser Verlag, Munich, Vienna, New York, Barcelona (1993) (Cover & Copyright pages).
Research Disclosure Database No. 502003, "Propylen polymers for melt blown applications," Kenneth Mason Publications, disclosed anonymously, published Feb. 2006.

* cited by examiner

*Primary Examiner* — Robert D. Harlan
(74) *Attorney, Agent, or Firm* — Dilworth IP, LLC

(57) ABSTRACT

A polypropylene resin comprising a propylene polymer endowed with the following characteristics: a) distribution of molecular weight Mw/Mn lower than 4; b) the melt-viscosity measured at a temperature of 250° C. in the shear rate range between 1000 1/s and 40000 1/s meet the following relationship: c) h 9*e(−0.00006*sr)+2 a. wherein h represents the melt-viscosity in Pas and sr the shear rate in 1/s d) the isotactic pentads (mmmm) measured with by $^{13}$C-NMR are higher than 90%; d) preferably higher than 92%; more preferably higher than 95% and most preferred higher than 96%; e) the hexane extractables according FDA regulations are preferably below 2.6 wt. %; and f) the xylene solubles are below 2 wt. %; with the proviso that the propylene polymer was not visbroken.

14 Claims, No Drawings

PROPYLENE POLYMERS

The present invention relates to a propylene polymer having high Melt flow rate and low extractables.

Propylene polymers have been used for years for obtaining films and molded articles. When used for particular applications such as food packaging and medical tools the value of extractables with solvents is an important parameter in order to evaluate the quality of the material. Two important parameters to be considered are the hexanes extractables according FDA regulations, and xylene solubles at 25° C. From another point of view propylene polymers having high melt flow rate have the drawback to have generally higher value of extractables. Due to process restrictions the polymerization of products with conventional Ziegler/Natta catalysts, high melt flow rates are limited to values of about 400 g/10'. To increase the melt flow rate further, the addition of peroxides is required. Despite the cost disadvantage for the peroxide, additional decomposition residuals from the peroxide have to be considered.

U.S. Pat. No. 5,741,563 relates to shrink films obtained by using a propylene polymers having a melt flow rate from 0.5 to 30 dg/min and hexane extractables are preferably less than 1% by weight.

Thus it would be desirable for certain applications to have propylene polymers endowed with low level of extractables and at the same time high melt flow rate values without any residuals coming from peroxidic or other kinds of degradation. In fact it is well known in the art that when a polymer is degraded with peroxides or other similar method, such as gamma rays some properties of the polymer becomes worse such as the yellowing index.

Thus the object of the present invention is a polypropylene resin comprising a propylene polymer endowed with the following characteristics:

a) distribution of molecular weight Mw/Mn lower than 4; preferably lower than 3; more preferably lower than 2.5; even more preferably lower than 2.3;

b) the melt-viscosity measured at a temperature of 250° C. in the shear rate range between 1000 1/s and 40000 1/s meet the following relationship:

$$h \leq 9*e(-0.00006*sr)+2$$

wherein h represents the melt-viscosity in Pas and sr the shear rate in 1/s c) the isotactic pentads (mmmm) measured with $^{13}$C-NMR are higher than 90%; preferably higher than 92%; more preferably higher than 95% even more preferably higher than 96%;

d) The hexane extractables determined according FDA regulations (Code of Federal Regulations, Title 21, Volume 3, Revised as of Apr. 1, 2004, CITE: 21CFR177.1520) are preferably lower than 2.6 wt. % more preferably lower than 1.8 wt. % and even more preferably lower than 1 wt. %;

e) The xylene solubles at 25° C. are below 2 wt. %, preferably below 1.5 wt. % and more preferably lower than 1.1 wt. %;

with the proviso that the propylene polymer was not visbroken.

The process for visbreaking a polymer consists in increasing the MFR of the latter by lowering the molecular weight of the polymers by means of chemical reactions such as radical reaction initiated by peroxides. The polymers obtained in this way presents some drawback, such as an high yellowing index, for this reason the polypropylene resin object of the present invention does not contains residues of peroxidic compounds.

Preferably the propylene polymer of the present invention has a melting point measured by means of DSC higher than 145° C.; preferably higher than 148° C., more preferably higher than 150° C., even more preferably higher than 153° C.

Preferably the propylene polymer of the present invention has a melt-viscosity at 250° C. according the general formula $h \leq K*e(-L*sr)+M$ in the shear rate range from 1000 1/s til 40000 1/s and more preferred in the shear rate range 2000 1/s til 30000 1/s.

in a preferred composition the values of the constants are given by K=9, L=0.00006 and M=2, more preferred K=7.25, L=0.00006 and M=2 and even more preferred K=2.5, L=0.00006 and M=2. Most preferred are the values K=2.5, L=0.00006 and M=1.3.

Preferably the melt-viscosity at a temperature of 250° C. and a shear rate of 1000 1/s is ≧1 Pas.

The propylene polymer of the present invention has preferably a content of 2,1-insertions lower than 0.5%, more preferred ≦0.3%. measured by $^{13}$C NMR spectroscopy as described below. The content of 1,3 insertions is preferably below 0.2%, more preferred ≦0.1%, it is measured by $^{13}$C NMR spectroscopy as described below.

The propylene polymer of the polypropylene resin object of the present invention is a propylene homopolymer.

The polypropylene resin of the present invention preferably further comprises customary amounts of customary additives known to those skilled in the art, e.g. stabilizers, lubricants and mold release agents, fillers, nucleating agents, antistatics, plasticizers, dyes, pigments, anti-fungal, anti-microbial agents, film cavitating agents or flame retardants. In general, these are incorporated during granulation of the powdery product obtained in the polymerization or the powder will be directly coated with the additives.

Customary stabilizers include antioxidants such as sterically hindered phenols, sterically hindered amines or UV stabilizers, processing stabilizers such as phosphites or phosphonites, acid scavengers such as calcium stearate or zinc stearate or dihydrotalcite, as well as calcium, zinc and sodium caprylate salts. In general, the propylene copolymer compositions of the present invention contain one or more stabilizers in amounts of up to 2% by weight.

Suitable lubricants and mold release agents are, for example, fatty acids, calcium, sodium or zinc salts of fatty acids, fatty acid amides or low molecular weight polyolefin waxes, which are usually used in concentrations of up to 2% by weight.

Possible fillers are, for example, talc, calcium carbonate, chalk or glass fibers, and these are usually used in amounts of up to 50% by weight.

Examples of suitable nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl)phosphate. The nucleating agent content of the propylene copolymer composition is generally up to 5% by weight.

Such additives are generally commercially available and are described, for example, in Gächter/Müller, Plastics Additives Handbook, 4th Edition, Hansa Publishers, Munich, 1993.

In a preferred embodiment, the propylene polymer compositions of the present invention contain a 1:1 mixture of sterically hindered phenols and phosphites or phosphonites. The content of this mixtures ranges from 0.03% to 1% by weight, preferably from 0.05 to 0.2500% by weight and more preferred from 0.1 to 0.2% by weight (tradename of such products are Irganox B 501W from Ciba Specialty Chemical).

The polypropylene resin object of the present invention can be used in many applications, such as in compounding as masterbatchses and melt blown applications, for example hygienic fabrics and filtration applications.

The propylene polymer of the polypropylene resin object of the present invention can be obtained by using a metallocene-based catalyst system.

In particular said propylene polymer is obtainable by using a catalyst system obtainable by contacting:
a) a metallocene compound of formula (I)

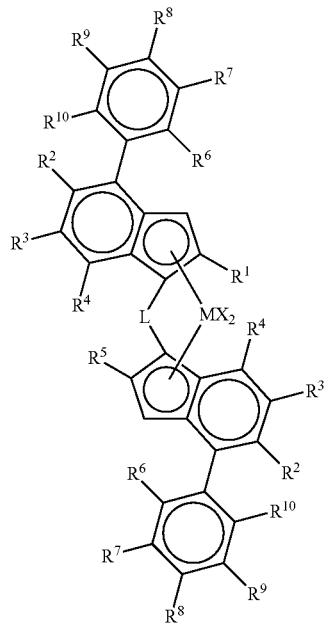

(I)

wherein
M is a transition metal belonging to group 3, 4, 5, 6 or to the lanthanide or actinide groups in the Periodic Table of the Elements; preferably M is titanium, zirconium or hafnium;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR.O group wherein R. is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silyliene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$; even more preferably $(Z(R'')_2)_n$ is $Si(CH_3)_2$;

$R^1$ and $R^5$ are a $C_1$-$C_{40}$ hydrocarbon radical optionally containing heteroatoms belonging to groups 13-17 of the Periodic Table of the Elements; preferably $R^1$ and $R^5$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^5$ are a linear or branched, saturated or unsaturated $C_1$-$C_{20}$-alkyl radical;

$R^2$, $R^3$ and $R^4$, equal to or different from each other, are hydrogen atoms or $C_1$-$C_{40}$ hydrocarbon radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{20}$-alkyl radicals;

$R^6$, $R^7$, $R^8$, $R^9$, and $R^{10}$ equal to or different from each other, are hydrogen atoms or $C_1$-$C_{40}$ hydrocarbon radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{40}$-alkyl radicals; with the proviso that at least one among $R^6$, $R^7$, $R^8$, $R^9$, and $R^{10}$ is different from an hydrogen atom; preferably $R^6$, $R^7$, $R^9$, and $R^{10}$ $R^8$ are hydrogen atoms;

preferably $R^8$ is a $C_1$-$C_{40}$-alkyl radicals, more preferably $R^8$ is a $C_1$-$C_{40}$-alkyl radical wherein the atom in the alpha position is a secondary carbon or a tertiary carbon, such as isopropyl or tertbutyl radicals;

b) at least an alumoxane or a compound able to form an alkylmetallocene cation; and c) optionally an organo aluminum compound.

Preferably the substituent $R^1$ is a linear $C_1$-$C_{20}$-alkyl radical such as methyl or ethyl radicals and the substituent $R^5$ is a branched $C_1$-$C_{20}$-alkyl radical, preferably the substituent $R^5$ is a branched $C_1$-$C_{20}$-alkyl radical wherein the carbon atom in the alpha position is a secondary or a tertiary carbon atom, such as an isopropyl radical.

Alumoxanes used as component b) in the catalyst system according to the present invention can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

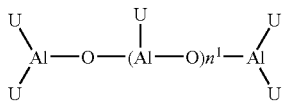

can be used in the case of linear compounds, wherein $n^1$ is 0 or an integer of from 1 to 40 and the substituents U are defined as above; or alumoxanes of the formula:

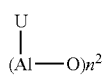

can be used in the case of cyclic compounds, wherein n is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:
tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl -3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl -butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl -pentyl)aluminium, tris(2-isopropyl-3,3-dimethyl-butyl)aluminium, tris(2-trimethylsilyl -propyl)aluminium, tris(2-methyl-3-phenyl-butyl)aluminium, tris(2-ethyl-3-phenyl -butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl -butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl] aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate, N,N-Dimethylbenzylammonium-tetrakispentafluorophe-
  nylborate,
N,N-Dimethylhexylamonium-tetrakispentafluorophenylbo-
  rate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)alumi-
  nate,
N,N-Dimethylbenzylammonium-tetrakispentafluorophe-
  nylborate,
N,N-Dimethylhexylamonium-tetrakispentafluorophenylbo-
  rate,
Di(propyl)ammoniumtetrakis(pentafluorophenyl)borate,
Di(cyclohexyl)ammoniumtetrakis(pentafluorophenyl)bo-
  rate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764.

Organic aluminum compounds used as compound c) are those of formula $H_jAlU_{3-j}$ or $H_jAl_2U_{6-j}$ as described above.

The catalysts described above can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The solid compound thus obtained, in combination with the further addition of the alkylaluminium compound either as such or prereacted with water if necessary, can be usefully employed in the gas-phase polymerization.

The following examples are given for illustrative purpose and do not intend to limit the invention.

EXAMPLES

Analysis

All data was obtained according to the following methods:
Rheological Measurements/Melt-Viscosity:

Determined according ISO 11443. Measurements were performed with a Goettfert Rheograph 2002 Capillary Rheometer at 3 different temperatures (200° C., 230° C. and 250° C.). Capillary length/diameter ratio was 40 (length 20 mm, diameter 0.5 mm). Entrance angle 180°

Following abbreviations were used:
g (1/s): shear rate
tapp (Pa): shear stress
h (Pas): viscosity of the polymer melt
Molecular Weights and MWD Molecular weights and molecular weight distribution were measured at 145° C. using a Alliance GPCV 2000 instrument (Waters) equipped with three mixed-bed columns TosoHaas TSK GMHXL-HT having a particle size of 13 μm. The dimensions of the columns were 300×7.8 mm. The mobile phase used was vacuum distilled 1,2,4-Trichlorobenzene (TCB) and the flow rate was kept at 1.0 ml/min. The sample solution was prepared by heating the sample under stirring at 145° C. in TCB for two hours. The concentration was 1 mg/ml. To prevent degradation, 0.1 g/l of 2,6-diterbutyl-p-cresol were added. 326.5 μL of solution were injected into the column set. A calibration curve was obtained using 10 polystyrene standard samples (EasiCal kit by Polymer Laboratories) with molecular weights in the range from 580 to 7500000; additionally two other standards with peak molecular weight of 11600000 and 13200000 from the same manufacturer were included. It was assumed that the K values of the Mark-Houwink relationship were:

$K=1.21\times10^{-4}$ dL/g and $\alpha=0.706$ for the polystyrene standards $K=1.90\times10^{-4}$ dL/g and $\alpha=0.725$ for the polypropylene samples A third order polynomial fit was used for interpolate the experimental data and obtain the calibration curve. Data acquisition and processing was done by using Empower 1.0 with GPCV option by Waters.

Intrinsic Viscosity:

Intrinsic viscosity was measured in tetrahydronaphtalene (THN) solution obtained by dissolving the polymer at 135° C. for 1 hour.

FDA Extractables

Code of Federal Regulations, Title 21, Volume 3, Revised as of Apr. 1, 2004, CITE: 21CFR177.1520

Xylene-Soluble Faction 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighted to determine the percentage of xylene-soluble polymer.

Melt Flow Rate (MFR)

Determined according to ISO 1133 (230° C., 2.16 Kg).

The ISO norm describes the procedure of measuring the MFR values til 150 g/10'. To measure the MFR value of products with higher MFR (up to ca. 3000 g/10') the unmodified procedure was applied.

Melting temperature, melting enthalpy (ΔHm), crystallization temperature and crystallization enthalpy (ΔHc) determined by DSC according ISO 3146 with a heating rate of 20K per minute $^{13}$C-NMR NMR analysis. $^{13}$C-NMR spectra of PP were acquired on a DPX-400 spectrometer operating at 100.61 MHz in the Fourier transform mode at 120° C. The peak of the mmmm pentad carbon were used as internal reference at 21.8 ppm and 29.9 ppm respectively. The samples were dissolved in 1,1,2,2-tetrachloroethane-d2 at 120° C. with a 8% wt/v concentration in a 5 mm tube. Each spectrum was acquired with a 90° pulse, 12 seconds of delay between pulses and CPD (WALTZ 16) to remove 1H-13C coupling. About 2500 transients were stored in 32K data points using a spectral window of 6000 Hz.

The assignments of PP spectra were made according to "Selectivity in Propylene Polymerization with Metallocene Catalysts", L. Resconi, L. Cavallo, A. Fait, F. Piemontesi, Chem. Rev., 100, 1253, (2000))

The mmmm content was obtained modelling the experimental pentad distribution with the enantiomorphic site model. The mmmm content of PP with high content of 2,1 (E) and 1,3 (H) errors was obtained as:

[mmmm]=100(Σ[CH$_3$]−5[mrrm]−5[E]−5[H])/(Σ[CH$_3$])

where Σ[CH$_3$] is the sum of all CH$_3$ groups

The content of 2,1 and 3,1 errors was obtained as:

[E]=100(E$_9$/Σ[CH$_2$])
[H]=100(0.5H$_2$/Σ[CH$_2$])

where E$_9$ is the peak at 42.14 ppm, H$_2$ is the peak at 30.82 ppm and Σ[CH$_2$] is the sum of all CH$_2$ groups.

Preparation of Polypropylene Resins

The catalyst system is prepared as described in PCT/EP2004/007061 by using rac-dimethylsilylene(2-methyl-4 (4'tertbutyl-phenyl)-indenyl) (2-isopropyl-4(4'tertbutyl-phenyl)-indenyl)zirconium dichloride prepared as described in US 2003/0149199 instead of rac-dimethylsilylbis(2-methyl-4,5-benzo-indenyl)-zirconium dichloride.

Propylene Polymerization

The catalyst system in the form of catalyst mud obtained as described in PCT/EP2004/007061 is fed in the precontact vessel in which it is diluted with about 5 (Kg/h) of propane. From the pre-contact vessel the catalyst system is fed to the prepolymerization loop in which propylene is fed at the same time according to the data reported in table 1. The residence time of the catalyst in the prepolymerization loop is 8 minutes. The prepolymerized catalyst obtained in the prepolymerization loop is then continuously feed into the first loop reactor in which propylene, is fed according to table 1. The polymer is discharged from the first loop reactor, separated from the unreacted monomer and dried. The reaction conditions are reported in table 1. The MFR of the product is controlled by the feed of hydrogen.

TABLE 1

| Ex | Prepolymerization temperature (° C.) | C$_3$ (Kg/h) | H$_2$ (ppm (mol)) | temperature (° C.) |
|---|---|---|---|---|
| 1 | 45 | 328 | 525 | 70 |
| 2 | 45 | 333 | 738 | 70 |
| 3 | 45 | 339 | 900 | 70 |

The isotactic pentades (mmmm) of all samples were higher than 95% (measured 96.4%) ($^{13}$C-NMR). The 2.1 insertions are ≦0.3% and the 1.3 insertions are ≦0.1% ($^{13}$C-NMR).

The products were characterized according table 2. The tests themselves were carried out in accordance with the standards indicated in table 2.

TABLE 2

| Method | Variable Name | Units | Example 1 | Example 2 | Example 3 |
|---|---|---|---|---|---|
| ISO1133 | Melt Flow Rate | g/10 min | 605 | 1335 | 1700 |
| ISO3146 | Hc | J/g | −97.6 | −97.4 | −96.9 |
| ISO3146 | Hm | J/g | 95.8 | 96.9 | −96.7 |
| ISO3146 | Tm | deg_C. | 155 | 156 | 153 |
| ISO3146 | Tc | deg_C. | 104.2 | 104.6 | 104.2 |
| | Intrinsic viscosity | dl/g | 0.62 | 0.54 | <0.5 |
| | Xylene solubles | % | 0.6 | 0.8 | 1 |
| | Mn (GPC) | g/mol | n.m. | 43497 | 39883 |
| | Mw(GPC) | g/mol | n.m. | 89997 | 86864 |
| | Mw/Mn | | 2.1 | 2.1 | 2.2 |
| FDA | Hexane Extractables 100 u film | % | 0.4 | 0.4 | 0.7 |

The melt-viscosity was determined according ISO 11443 at three different temperatures (200° C.; 230° C. and 250° C.). The results are reported in tables 3—

TABLE 3

Example 1

| Shear viscosity 200° C. g (s$^{−1}$) | t$_{app}$ (Pa) | Melt-viscosity h (Pa*s) | Shear rate 230° C. g (s$^{−1}$) | t$_{app}$ (Pa) | Melt-viscosity h (Pa*s) |
|---|---|---|---|---|---|
| 89979.4 | 167776.0 | 1.9 | 69256.5 | 137244.0 | 2.0 |
| 37067.2 | 132358.0 | 3.6 | 32244.4 | 103505.0 | 3.2 |
| 16005.3 | 99688.6 | 6.2 | 14904.6 | 73430.6 | 4.9 |
| 7246.6 | 70682.7 | 9.8 | 6963.1 | 48699.3 | 7.0 |
| 3410.9 | 46867.4 | 13.7 | 3320.5 | 30227.2 | 9.1 |
| 1656.3 | 29463.8 | 17.8 | 1607.8 | 17403.5 | 10.8 |
| 806.3 | 16640.2 | 20.6 | 784.5 | 9312.4 | 11.9 |
| 397.1 | 9007.1 | 22.7 | | | |
| 195.2 | 4579.9 | 23.5 | | | |
| 96.4 | 2289.9 | 23.8 | | | |
| 48.8 | 1068.6 | 21.9 | | | |

| Shear rate 250° C. g (s$^{−1}$) | t$_{app}$ (Pa) | Melt-viscosity h (Pa*s) | 9 *e (−0.00006* sr) + 2 |
|---|---|---|---|
| 71027.8 | 121672.0 | 1.7 | 2.126889 |
| 30983.3 | 88849.5 | 2.9 | 3.402458 |
| 14144.1 | 60149.0 | 4.3 | 5.851946 |
| 6738.6 | 38928.9 | 5.8 | 8.006899 |
| 3275.4 | 23510.0 | 7.2 | 9.394235 |
| 1597.0 | 12976.3 | 8.1 | 10.17765 |
| 775.8 | 6564.5 | 8.5 | 10.59067 |

TABLE 4

Example 2

| Shear rate 200° C. g (s$^{−1}$) | t$_{app}$ (Pa) | Melt-viscosity h (Pa*s) | Shear rate 230° C. g (s$^{−1}$) | t$_{app}$ (Pa) | Melt-viscosity h (Pa*s) |
|---|---|---|---|---|---|
| 52354.8 | 134496.0 | 2.6 | 51466.7 | 108085.0 | 2.1 |
| 24755.7 | 99077.9 | 4.0 | 26745.7 | 75415.2 | 2.8 |
| 12873.9 | 68850.8 | 5.3 | 13614.5 | 49310.0 | 3.6 |
| 6747.0 | 45035.4 | 6.7 | 6750.4 | 30074.5 | 4.5 |
| 3457.4 | 27173.9 | 7.9 | 3274.4 | 16945.5 | 5.2 |
| 1725.2 | 15113.6 | 8.8 | 1578.4 | 8701.8 | 5.5 |

TABLE 4-continued

Example 2

| | | | | | |
|---|---|---|---|---|---|
| 844.9 | 7938.5 | 9.4 | 770.2 | 4274.6 | 5.6 |
| 408.1 | 3969.2 | 9.7 | 391.2 | 1984.6 | 5.1 |
| 193.5 | 1832.0 | 9.5 | | | |

| Shear rate 250° C. g ($s^{-1}$) | $t_{app}$ (Pa) | Melt-viscosity h (Pa*s) | $9*e(-0.00006*sr)+2$ |
|---|---|---|---|
| 57794.5 | 91750.1 | 1.6 | 2.280707 |
| 27355.4 | 61065.0 | 2.2 | 3.74351 |
| 13183.5 | 38318.3 | 2.9 | 6.08048 |
| 6482.0 | 22594.0 | 3.5 | 8.100096 |
| 3210.7 | 12365.7 | 3.9 | 9.422995 |
| 1572.6 | 6106.5 | 3.9 | 10.18963 |
| 774.0 | 2747.9 | 3.6 | 10.5916 |
| 398.4 | 1221.3 | 3.1 | 10.78741 |

TABLE 5

Example 3

| Shear rate 200° C. g ($s^{-1}$) | $t_{app}$ (Pa) | Melt-viscosity h (Pa*s) | Shear rate 230° C. g ($s^{-1}$) | $t_{app}$ (Pa) | Melt-viscosity h (Pa*s) |
|---|---|---|---|---|---|
| 60486.3 | 107474.0 | 1.8 | 61014.7 | 79842.5 | 1.3 |
| 28397.9 | 75567.9 | 2.7 | 27915.6 | 53126.5 | 1.9 |
| 13685.5 | 50989.3 | 3.7 | 13188.7 | 32364.4 | 2.5 |
| 6661.9 | 31143.1 | 4.7 | 6729.8 | 18777.5 | 3.0 |
| 3079.6 | 13587.0 | 5.1 | 3174.0 | 10533.7 | 3.3 |
| | | | 1544.0 | 5190.5 | 3.4 |

| Shear rate 250° C. g ($s^{-1}$) | $t_{app}$ (Pa) | Melt-viscosity h (Pa*s) | $9*e(-0.00006*sr)+2$ |
|---|---|---|---|
| 49759.5 | 67171.5 | 1.3 | 2.454596 |
| 25828.9 | 43356.1 | 1.6 | 3.91074 |
| 13150.1 | 25952.6 | 2.0 | 6.088665 |
| 6582.1 | 14655.6 | 2.2 | 8.063569 |
| 3254.6 | 7938.5 | 2.4 | 9.403468 |
| 1574.8 | 3969.2 | 2.5 | 10.18855 |

Comparative example 4 was polymerized according Example 1-3 with the polymerization conditions reported in table 6.

TABLE 6

| Comp. Ex 4 | Prepolymerization temperature (° C.) | $C_3$ (Kg/h) | $H_2$ (ppm (mol)) | temperature (° C.) |
|---|---|---|---|---|
| 4 | 45 | 328 | 480 | 70 |

Characterization of comparative sample 4 gave the following results:

TABLE 7

| Method | Variable Name | Units | Comparative Example 4 |
|---|---|---|---|
| ISO1133 | Melt Flow Rate | g/10 min | 390 |
| ISO3146 | Hc | J/g | −94.9 |
| ISO3146 | Hm | J/g | 93.3 |
| ISO3146 | Tm | ° C. | 154 |
| ISO3146 | Tc | ° C. | 104.9 |
| | Intrinsic viscosity | dl/g | 0.69 |
| | Xylene solubles | % | <0.5 |

TABLE 7-continued

| Method | Variable Name | Units | Comparative Example 4 |
|---|---|---|---|
| | Mn (GPC) | g/mol | n.m. |
| | Mw(GPC) | g/mol | n.m. |
| | Mw/Mn | | n.m. |
| FDA | Hexane Extractables, 100 u film | % | 0.4 |

The rheological characterization gave the following results:

TABLE 8

Comparative Example 4

| Shear rate 200° C. g ($s^{-1}$) | $t_{app}$ (Pa) | Melt-viscosity h (Pa*s) | Shear rate 230° C. g ($s^{-1}$) | $t_{app}$ (Pa) | Melt-viscosity h (Pa*s) |
|---|---|---|---|---|---|
| 89022.4 | 187011.0 | 2.1 | 85533.9 | 155868.0 | 1.8 |
| 38689.5 | 150525.0 | 3.9 | 35799.8 | 121519.0 | 3.4 |
| 17103.6 | 117855.0 | 6.9 | 15655.5 | 90223.5 | 5.8 |
| 7704.6 | 86864.9 | 11.3 | 7171.8 | 63507.6 | 8.9 |
| 3584.2 | 60912.3 | 17.0 | 3393.7 | 41524.2 | 12.2 |
| 1705.1 | 39692.2 | 23.3 | 1640.9 | 25189.3 | 15.4 |
| 824.0 | 23968.0 | 29.1 | 806.9 | 14502.9 | 18.0 |
| 401.4 | 13434.3 | 33.5 | 395.3 | 7633.1 | 19.3 |
| 197.1 | 7175.1 | 36.4 | 193.7 | 3816.6 | 19.7 |
| 96.9 | 3663.9 | 37.8 | 96.9 | 1832.0 | 18.9 |
| 48.0 | 1832.0 | 38.2 | | | |

| Shear rate 250° C. g ($s^{-1}$) | $t_{app}$ (Pa) | Melt-viscosity h (Pa*s) | $9*e(-0.00006*sr)+2$ |
|---|---|---|---|
| 76149.7 | 139686.0 | 1.8 | 2.093317 |
| 32309.1 | 103810.0 | 3.2 | 3.295217 |
| 14548.0 | 73125.3 | 5.0 | 5.75972 |
| 6838.5 | 48394.0 | 7.1 | 7.971001 |
| 3296.5 | 29769.2 | 9.0 | 9.384879 |
| 1615.6 | 17250.9 | 10.7 | 10.16853 |
| 790.5 | 9159.8 | 11.6 | 10.5831 |
| 383.6 | 4427.2 | 11.5 | 10.79522 |

The invention claimed is:
1. A polypropylene resin comprising a propylene polymer, the propylene polymer comprising:
a distribution of molecular weight Mw/Mn lower than 43;
a melt-viscosity measured at a temperature of 250° C. in a shear rate ranging from 1000 1/s to 40000 1/s, and the melt-viscosity satisfies the following relationship:

$$h \leq 9*e(-0.00006*sr)+2$$

wherein
h is the melt-viscosity in Pas; and
sr is the shear rate in 1/s;
isotactic pentads (mmmm) measured with $^{13}$C-NMR are higher than 90%;
a hexane extractables according FDA regulations are below 2.6 wt. %; and
xylene solubles are below 2 wt. %;
with the proviso that the propylene polymer was not visbroken.
2. The polypropylene resin according to claim 1, wherein the isotactic pentads (mmmm) are higher than 92%.
3. The polypropylene resin according to claim 1, wherein the isotactic pentads (mmmm) are higher than 95%.
4. The polypropylene resin according to claim 1, wherein the isotactic pentads (mmmm) are higher than 96%.

5. The polypropylene resin according to claim 1, wherein the polypropylene resin does not contain residues of peroxidic compounds.

6. The polypropylene resin according to claim 1, wherein the melt-viscosity satisfies the following relationship:

$$h \leq 7.25 * e(-0.00006 * sr) + 2$$

wherein
h is the melt-viscosity in Pas; and
sr is the shear rate in 1/s.

7. The polypropylene resin according to claim 1, wherein the propylene polymer comprises a content of 2,1-insertions lower than 0.5% measured with $^{13}$C-NMR.

8. The polypropylene resin according to claim 1 further comprising from 0.03% to 1% by weight of a 1:1 mixture of sterically hindered phenols, and phosphites or phosphonites.

9. The polypropylene resin according to claim 1, wherein the hexane extractables are lower than 1.8% by weight.

10. The polypropylene resin according to claim 1, wherein the xylene solubles are below 1.5% by weight at 25° C.

11. The polypropylene resin according to claim 1, wherein in the propylene polymer comprises less than 0.2% by weight of 1,3 insertions.

12. The polypropylene resin according to claim 1, wherein the propylene polymer comprises a melting point higher than 145° C. measured by means of DSC.

13. A hygienic fabric comprising a polypropylene resin, the polypropylene resin comprising a propylene polymer, the propylene polymer comprising:
  a distribution of molecular weight Mw/Mn lower than 3;
  a melt-viscosity measured at a temperature of 250° C. in a shear rate ranging from 1000 1/s to 40000 1/s, and the melt-viscosity satisfies the following relationship:

$$h \leq 9 * e(-0.00006 * sr) + 2$$

wherein
  h is the melt-viscosity in Pas; and
  sr is the shear rate in 1/s;
isotactic pentads (mmmm) measured with $^{13}$C-NMR are higher than 90%;
a hexane extractables according FDA regulations are below 2.6 wt. %; and
xylene solubles are below 2 wt. %;
with the proviso that the propylene polymer was not vis-broken.

14. A filtration tool comprising a polypropylene resin, the polypropylene resin comprising a propylene polymer, the propylene polymer comprising:
  a distribution of molecular weight Mw/Mn lower than 3;
  a melt-viscosity measured at a temperature of 250° C. in a shear rate ranging from 1000 1/s to 40000 1/s, and the melt-viscosity satisfies the following relationship:

$$h \leq 9 * e(-0.00006 * sr) + 2$$

wherein
  h is the melt-viscosity in Pas; and
  sr is the shear rate in 1/s;
isotactic pentads (mmmm) measured with $^{13}$C-NMR are higher than 90%;
a hexane extractables according FDA regulations are below 2.6 wt. %; and
xylene solubles are below 2 wt. %;
with the proviso that the propylene polymer was not vis-broken.

* * * * *